United States Patent
Zimlich et al.

[11] Patent Number: 5,385,016
[45] Date of Patent: Jan. 31, 1995

[54] AIR/FUEL CONTROL SYSTEM RESPONSIVE TO DUO UPSTREAM EGO SENSORS WITH CONVERTER MONITORING

[75] Inventors: Glenn A. Zimlich, Dearborn Heights; Daniel V. Orzel, Westland; Tri T. Truong, Inkster, all of Mich.

[73] Assignee: Ford Motor Company, Dearborn, Mich.

[21] Appl. No.: 173,007

[22] Filed: Dec. 27, 1993

[51] Int. Cl.⁶ .............................. F01N 3/20
[52] U.S. Cl. .......................... 60/274; 60/276; 60/277; 60/285; 123/703
[58] Field of Search ............ 60/274, 276, 277, 285; 123/703

[56] References Cited

U.S. PATENT DOCUMENTS

| | | | |
|---|---|---|---|
| 4,747,265 | 5/1988 | Nagai et al. | 60/285 |
| 5,074,113 | 12/1991 | Matsuoka | 60/276 |
| 5,115,639 | 5/1992 | Gopp | 60/276 |
| 5,247,793 | 9/1993 | Yamada | 60/277 |

Primary Examiner—Ira S. Lazarus
Assistant Examiner—Daniel J. O'Connor
Attorney, Agent, or Firm—Allan J. Lippa; Roger L. May

[57] ABSTRACT

A system and method of controls air/fuel ratio of an engine having exhaust manifolds from first and second cylinder banks coupled to a single catalytic converter. Fuel delivered to the cylinders of the first cylinder bank and the second cylinder bank are adjusted in response to respective first and second upstream exhaust gas oxygen sensors coupled to the first and second exhaust manifolds, and a downstream exhaust gas oxygen sensor positioned downstream of the converter. An inferred signal is read from a table having the first and second sensors as their inputs. This inferred signal is an inference of an output from a hypothetical exhaust gas oxygen sensor exposed to a hypothetical blended mixture of exhaust gases from the first and second exhaust manifolds. Converter efficiency is indicated by a ratio of a count in transitions between output states of the downstream sensor to a count in transitions between output states of the inferred signal.

16 Claims, 6 Drawing Sheets

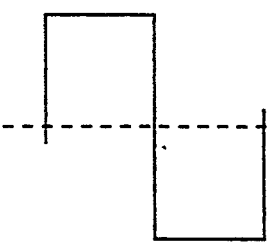
FIG.5A
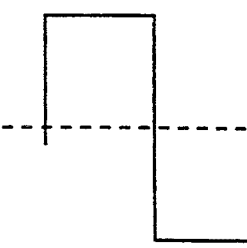
FIG.5B
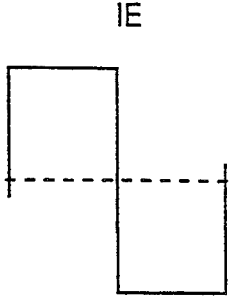
FIG.5C
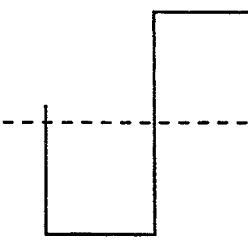
FIG.6A
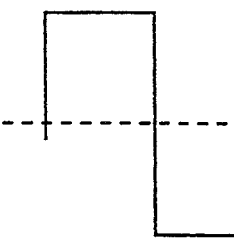
FIG.6B
FIG.6C
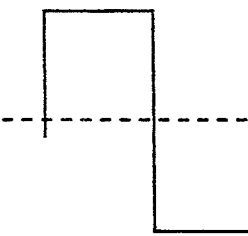
FIG.7A
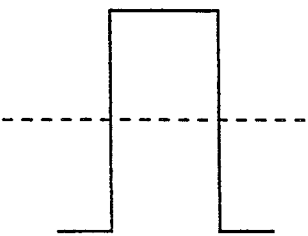
FIG.7B
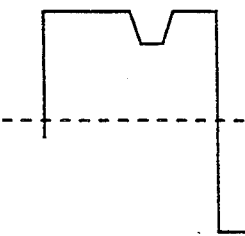
FIG.7C
FIG.8

AIR/FUEL CONTROL SYSTEM RESPONSIVE TO DUO UPSTREAM EGO SENSORS WITH CONVERTER MONITORING

FIELD OF THE INVENTION

The invention relates to air/fuel control systems responsive to an exhaust gas oxygen sensor coupled to each cylinder bank of an engine, the control system also monitors catalytic converter efficiency.

BACKGROUND OF THE INVENTION

Engine air/fuel control systems responsive to exhaust gas oxygen sensors positioned both upstream and downstream of a catalytic converter are known such as disclosed in U.S. Pat. No. 5,115,639. It is also known to monitor the efficiency of the converter by comparing an output of the upstream sensor to an output of the downstream sensor. In one specific application, comparison of the switching frequency of the downstream to upstream sensor provides an indication of converter efficiency.

The inventors herein have recognized numerous problems with the above approaches. For example, monitoring converter efficiency by comparing upstream EGO sensor to downstream EGO sensor switching frequency is not possible for engines having V-configurations and separate upstream EGO sensors coupled to each cylinder bank. The inventors herein have also recognized that in a conventional switching frequency comparison test, insufficient switching time in the sensors may result in inaccurate efficiency indications. Further, such systems do not examine converter efficiency over the full range of possible exhaust gas flow rates.

SUMMARY OF THE INVENTION

An object of the invention herein is to provide both air/fuel control and catalytic monitoring in systems having a separate exhaust gas oxygen sensor for each cylinder bank.

The above object is achieved, and problems of prior approaches overcome, by providing both a control system and method for controlling air/fuel ratio of an engine having exhaust manifolds from first and second cylinder banks coupled to a single catalytic converter. In one particular aspect of the invention the method comprises the steps of: adjusting fuel delivered to the cylinders of the first cylinder bank in response to a first upstream exhaust gas oxygen sensor coupled to the first exhaust manifold and a downstream exhaust gas oxygen sensor positioned downstream of the catalytic converter; adjusting fuel delivered to the cylinders of the second cylinder bank in response to a second upstream exhaust gas oxygen sensor coupled to the second exhaust manifold and the downstream exhaust gas oxygen sensor; creating an inferred signal from the first and second sensors which is an inference of an output from a hypothetical exhaust gas oxygen sensor exposed to a hypothetical blended mixture of exhaust gases from the first and second exhaust manifolds; and indicating converter efficiency in response to a ratio of a count in transitions between output states of the downstream sensor to a count in transitions between output states of the inferred signal.

Preferably, the above efficiency test occurs during a test period which is completed when the engine has completed operation within each of a plurality of inductive air flow ranges for at least a minimum duration in each of the air flow ranges. Preferably, the minimum duration is determined when the inferred signal has completed a predetermined number of transitions.

An advantage of the above aspect of the invention is that accurate indications of converter efficiency are provided using a frequency ratio of upstream to downstream sensors in systems having separate upstream sensors for each cylinder bank. Another advantage of the above aspect of the invention is that the predetermined test periods assure testing of the catalytic converter under the full range of exhaust gas flows. Still another advantage of the above aspect of the invention is that converter efficiency is monitored while engine air/fuel operation is maintained at stoichiometry.

BRIEF DESCRIPTION OF THE DRAWINGS

The object and advantages of the invention described above will be more clearly understood by reading an example of an embodiment in which the invention is used to advantage with reference to the attached drawings wherein:

FIGS. 5A-5C, 6A-6C, and 7A-7C illustrate various electrical signals emanating from a portion of the embodiment shown in FIG. 1 under hypothetical operating conditions described herein; and FIG. 8 is a graphical representation of converter efficiency.

DESCRIPTION OF AN EMBODIMENT

Figure 1:
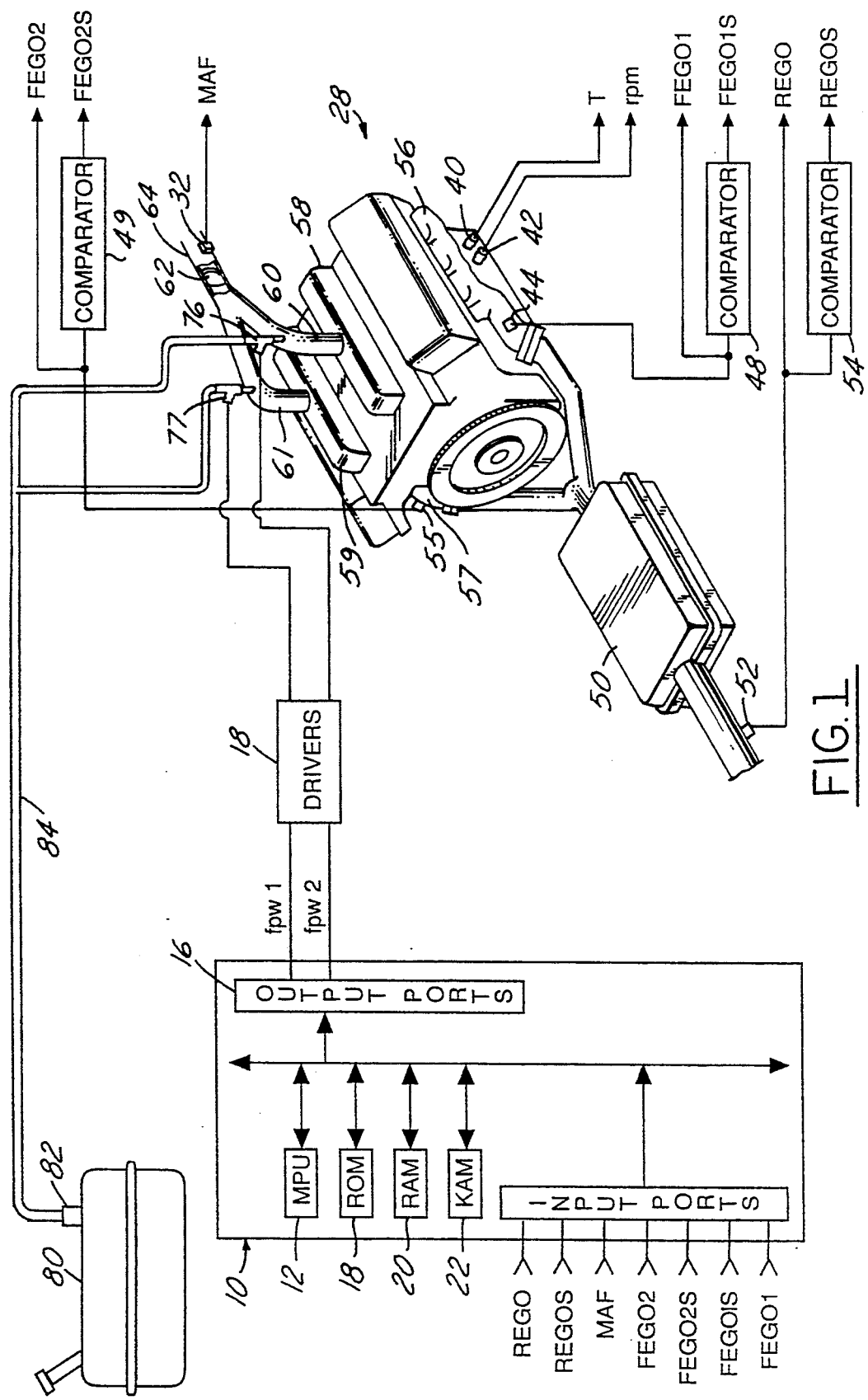
FIG. 1 is a block diagram of an embodiment where the invention is used to advantage.

Controller 10 is shown including a conventional microcomputer including: microprocessor unit 12; input ports 14; output ports 16; read only memory 18, for storing the controlled program; random access memory 20, for temporary data storage which may also be used for counters or timers; keep alive memory 22, for storing learned values; and a conventional data boss. Outputs are shown coupled to conventional electronic drivers 18.

Controller 10 is shown receiving various signals from sensors coupled to engine 28 including: measurement of inducted mass air flow (MAF) from air flow sensor 32, engine coolant aperture (T) from temperature sensor 40; and indication of engine speed (RPM) from tachometer 42.

Output signal FEGO1 is provided from conventional exhaust gas oxygen sensor 44 coupled to right hand exhaust manifold 56 which, in this particular example, is coupled to the right hand cylinder bank of a V-8 engine. Similarly, output signal FEGO2 is shown provided by conventional exhaust gas oxygen sensor 54 coupled to left hand exhaust manifold 57. Both signal FEGO1 and signal FEGO2 are compared to a respective reference value associated with stoichiometry in respective comparators 48 and 49 to generate respective signals FEGO1S and FEGO2S. Both signal FEGO1S and signal FEGO2S are two-state signals having a predetermined high voltage when exhaust gases are rich of stoichiometry and a predetermined low voltage when exhaust gases are lean of stoichiometry.

Another conventional exhaust gas oxygen sensor (50) is shown coupled to the engine exhaust downstream of catalytic converter 52, sensor 50 provides signal REGO to controller 10 which is related to oxygen content in the exhaust gases. Output signal REGO is also compared to a reference value associated with stoichiometry to provide two-state output signal REGOS to controller 10. Signal REGOS is a preselected high voltage when exhaust gas downstream of catalytic converter 50 are rich of stoichiometry and a low selected voltage when such exhaust gases are lean of stoichiometry.

Intake manifold 58 and intake manifold 59 are respectively coupled to the right hand cylinder bank and left hand cylinder bank of engine 28 and are also shown communicating with respective throttle body 60 and throttle body 61. Each throttle body in turn is shown connected to single air intake 64. Throttle plate 62 and mass air flow sensor 32 are shown coupled to air intake 64.

Continuing with FIG. 1, conventional electronic fuel injectors 76 and 77 are shown coupled to respective throttle body 60 and throttle body 61. Fuel injectors 76 delivers fuel in response in proportion to the pulse width of signal fpw1 from controller 10 via one of the conventional electronic drivers 18. Similarly, fuel injector 77 delivers fuel in proportion to the pulse width of signal fpw2 from controller 10 via one of the electronic drivers 18. Fuel is delivered to fuel injectors 76 and 77 by a conventional fuel system including fuel tank 80, fuel pump 82, and fuel rail 84.

Those skilled in the art will recognize that although a central fuel injected (CFI) system is shown for each cylinder bank, the invention claimed herein is also applicable to cylinder banks having a separate fuel injector for each cylinder.

Figure 2:
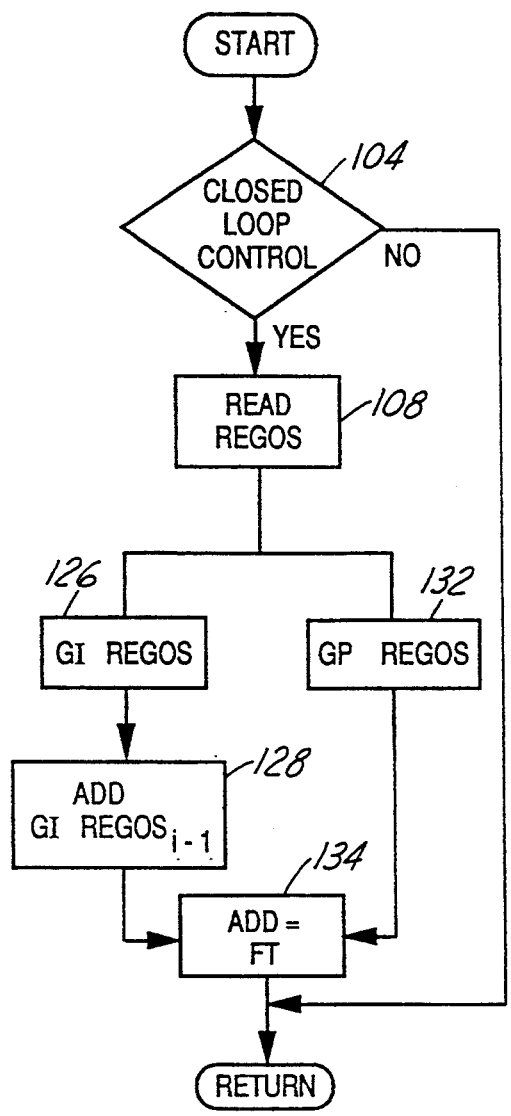
FIGS. 2, 3, and 4A-4B are high level flow charts of various operations performed by a portion of the embodiment shown in FIG. 1.

Referring now to FIG. 2, a flow chart of a routine performed by controller 10 to generate fuel trim signal FT is now described. The routine is entered after closed loop air/fuel control is commenced (step 104) in response to preselected engine operating conditions such as a temperature. When closed loop control commences, signal REGOS is read from comparator 54 (step 106) and subsequently processed in the proportional plus integral control described below.

Referring first to step 126, signal REGOS is multiplied by gain constant GI and the resulting product added to those products previously accumulated (GI* $REGOS_{i-1}$) in step 128. Stated another way, signal REGOS is integrated each sample period (i) in steps determined by gain constant GI. During step 132, signal REGOS is multiplied by proportional gain GP. The integral value from step 128 is added to the proportional value from step 132 during addition step 134 to generate fuel trim signal FT.

Figure 3A:
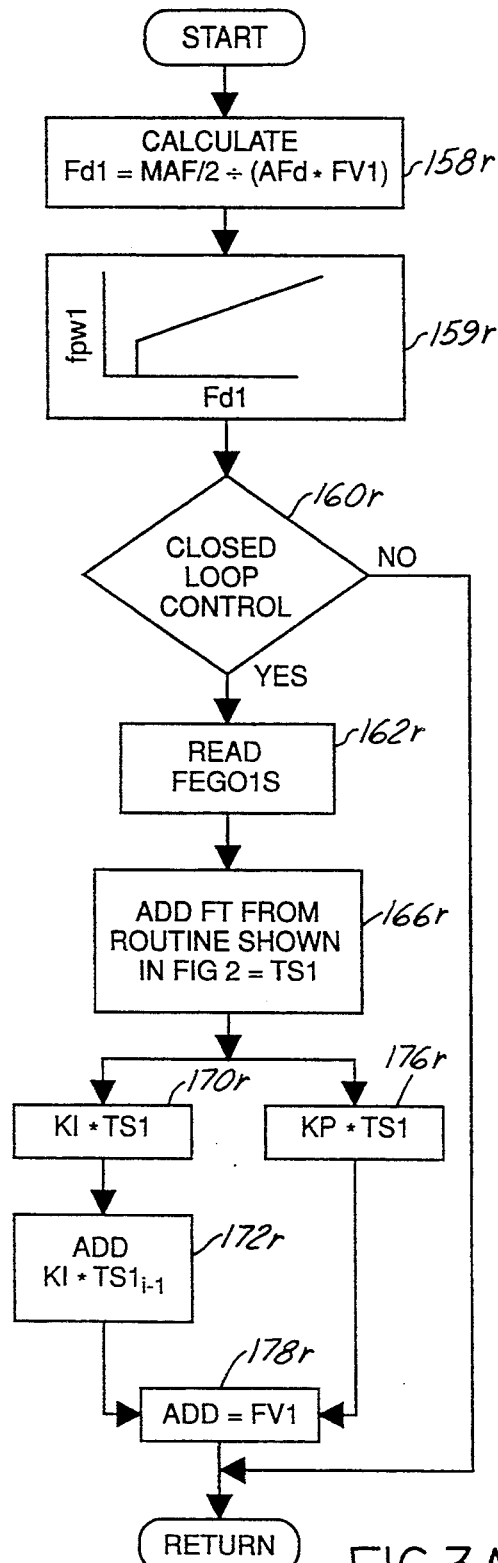

A separate fuel delivering and fuel adjusting routine is executed by controller 10 for both the left hand cylinder bank and the right hand cylinder bank. Referring first to the right hand cylinder bank and corresponding FIG. 3A, an open loop fuel quantity is first determined by dividing the measurement of inducted mass air flow (MAF) by desired air/fuel ratio AFd which is typically the stoichiometric value for gasoline combustion (step 158r). This open loop fuel charge is then adjusted, in this example divided, by feedback variable FV1. The resulting desired quantity of fuel, expressed as signal Fd1, is then converted into corresponding pulse width signal fpw1 (step 159r).

After determining that closed loop control is desired (step 160r), by monitoring engine operating conditions such as temperature (T), signal FEGO1S is read during step 162r. During step 166r, fuel trim signal FT is transferred from the routine previously described with reference to FIG. 2 and added to signal FEGO1S to generate trim signal TS1.

A conventional proportional plus integral feedback control routine is executed with trimmed signal TS1 as the input during steps 170r–178r. Trim signal TS1 is first multiplied by integral gain value KI (step 170r), and the resulting product added to the previously accumulated products (step 172r). That is, trim signal TS1 is integrated in steps determined by gain constant KI, each sample period (i) during step 172r. A product of proportional gain KP times trim signal TS1 (step 176) is then added to the integration of KI* TS during step 178r to generate feedback variable FV1.

Figure 3B:
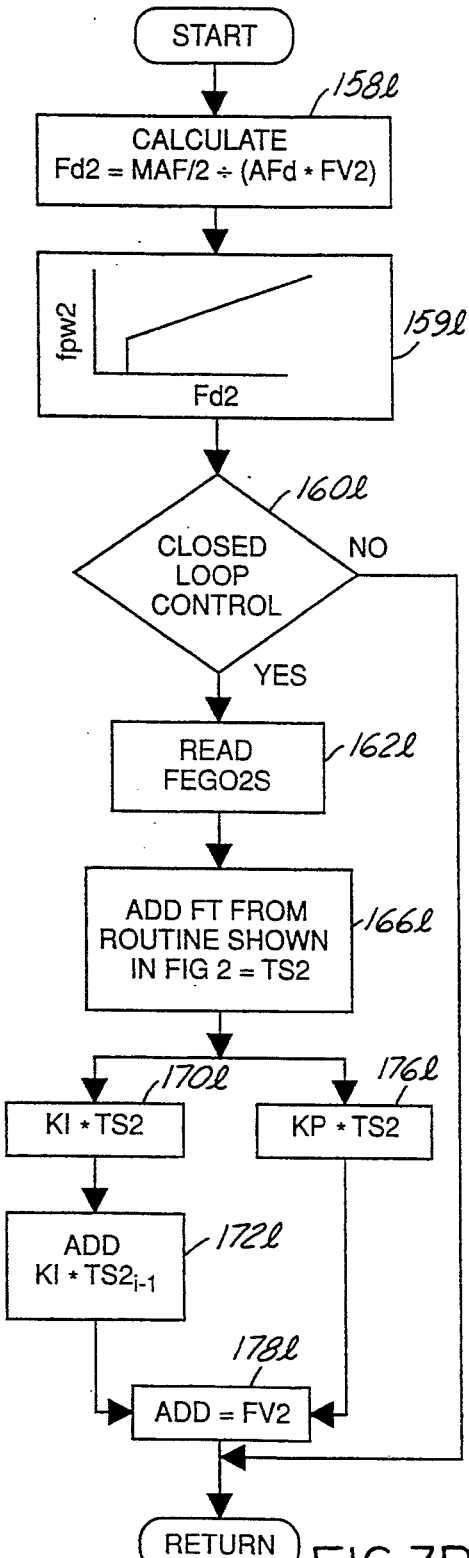

Substantially similar operations are performed by controller 10 to generate the desired quantity of liquid fuel delivered to engine 28 (fuel signal Fd2 and pulse width signal fpw2), and trimming this desired fuel quantity by feedback variable FV2 which is related to both sensor 57 and fuel trim signal FT. The routines executed by controller 10 for delivering fuel to left intake manifold 59 is described in process steps 158L–178L shown in Figure 3B. These process steps are substantially the same as those previously described with respect to delivering fuel to right hand intake manifold 58 in FIG. 3A wherein like numerals refer to like process steps and like components.

Figure 4C:
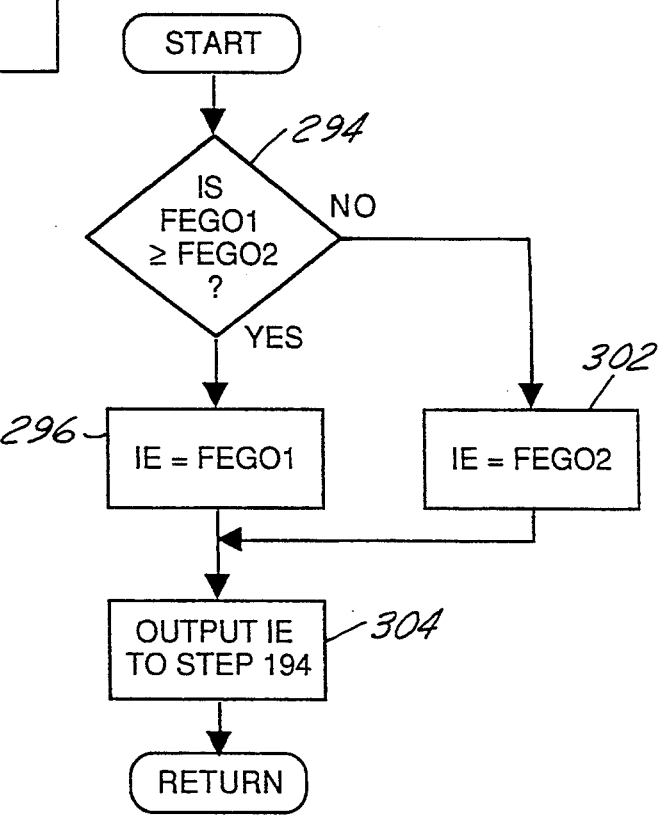
FIG. 4C is a high level flow chart of an alternative embodiment to a portion of the embodiment shown in FIGS. 4A-4B.
Figure 4A:
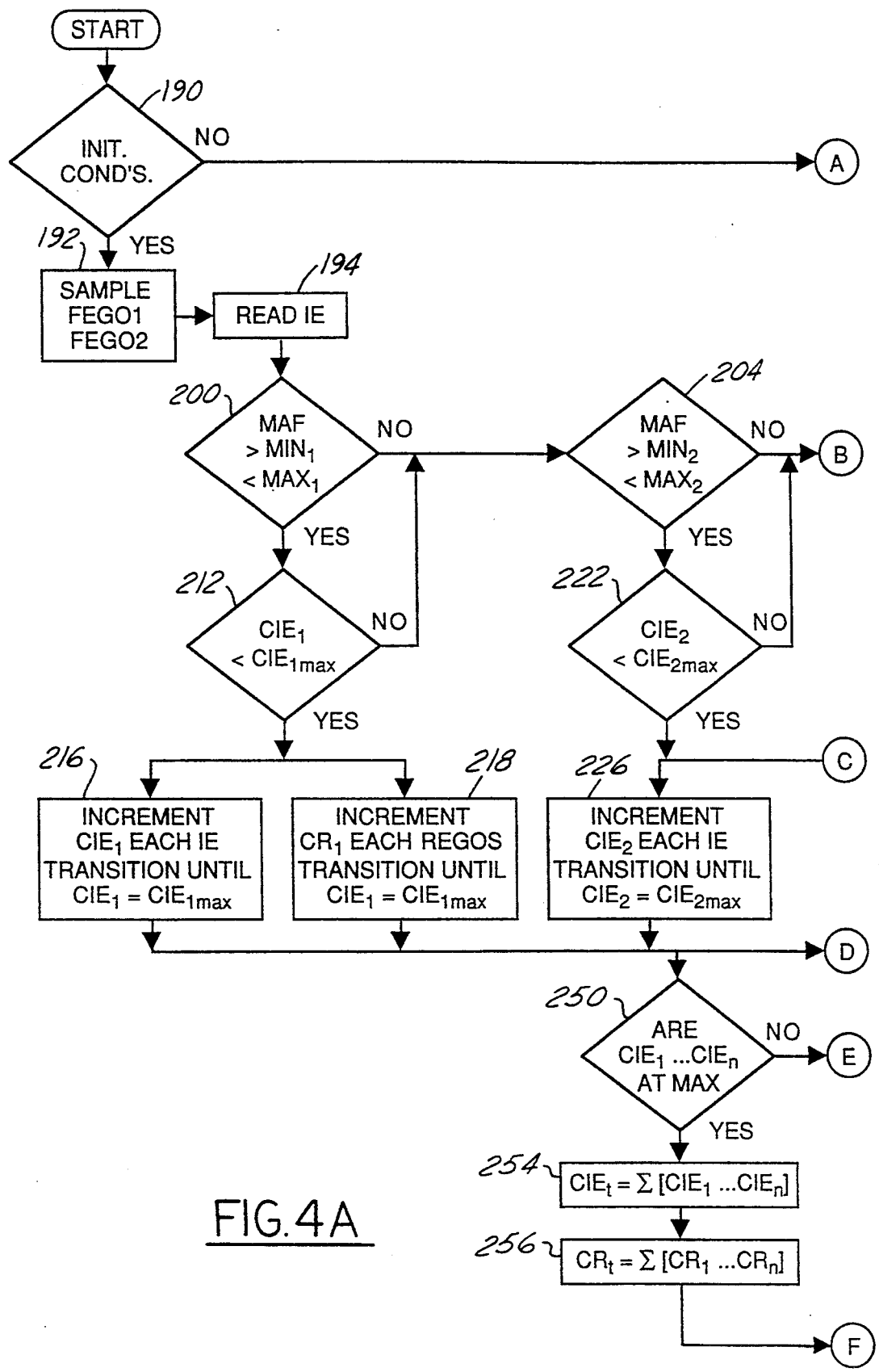
Figure 4B:
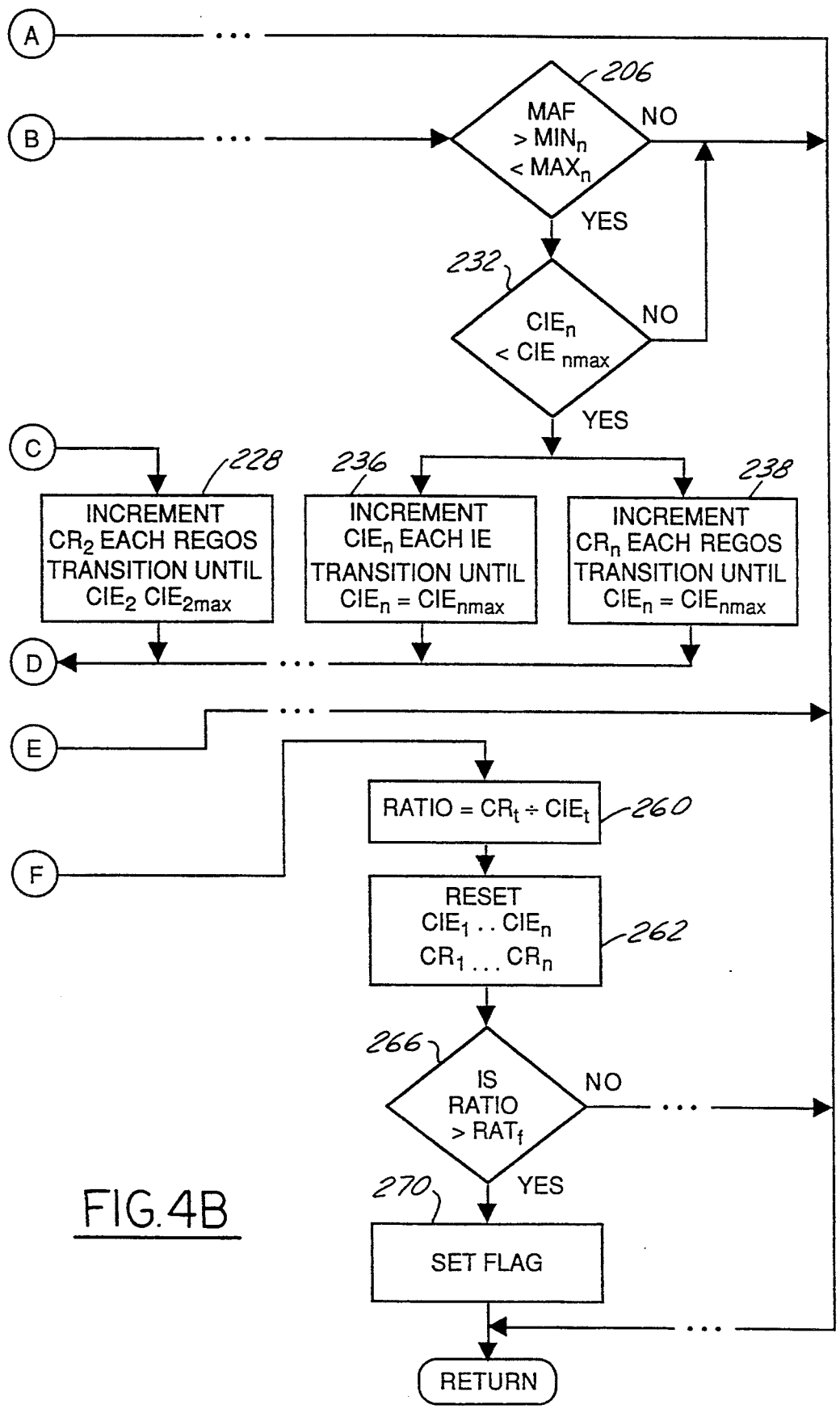

An example of indicating converter efficiency is now described with particular reference to the flow charts shown in FIGS. 4A–4B. During step 190, initial engine conditions are checked before entering the test cycle described below. More specifically, engine temperature (T) should be within a predetermined range, a predetermined time should have elapsed since the engine was started, and closed loop air/fuel control should have been operable for at least a preselected time.

For each background loop, both signal FEGO1 and signal FEGO2 are read (step 192). With these two signals addressing a lookup table, inferred signal IE is read (step 194). Inferred signal IE is an inference of an output from a hypothetical exhaust gas oxygen sensor exposed to a hypothetical blended mixture of exhaust gases from right hand exhaust manifold 58 and left hand exhaust manifold 59.

For illustrative purposes, a number of inferred signals IE are shown in FIGS. 5A–5C, 6A–6C, and 7A–7C for a combination of signals from upstream sensors 44 and 55. For example, when signal FEGO1 and signal FEGO2 are in phase (FIGS. 5A and 5B), inferred signal IE will appear similar to signal FEGO1 and signal FEGO2 as shown in Figure 5C. When signal FEGO1 and signal FEGO2 are out of phase (FIG. 6A and 6B), inferred signal IE will appear substantially rich with an excursion towards a lean indication at the phase shifts of the upstream sensor signals as shown in FIG. 6C. An example of overlapping phases for the upstream sensor signals is shown in FIGS. 7A and 7B, and the resulting inferred signals shown in FIG. 7C. Accordingly, by empirical testing and measurements, a table of inferred signals for many combinations of the upstream sensor signals is generated.

An alternate embodiment for inferring inferred signal IE from signal FEGO1 and signal FEGO2 is shown in FIG. 4C. When signal FEGO1 is greater than or equal to signal FEGO2 (step 294), inferred signal IE is set equal to signal FEGO1 (step 296). On the other hand, when signal FEGO2 is greater than signal FEGO1 (step 294), inferred signal IE is set equal to signal FEGO2 (step 302). During step 304, inferred signal IE is transferred to step 194 of the routine shown in FIG. 4A.

Returning to FIG. 4A, the inducted air flow range in which engine 28 is operating is determined during steps 200, 204, and 206. These ranges are described as range (1), range (2), and range (n) for this particular example wherein "n" inducted air flow ranges are used to advantage. Assuming engine operation is within air flow range (1), transitions between states of inferred signal IE are counted to generate count signal $CIE_1$. This count is compared to maximum count $CIE_{1max}$ during step 212. While engine operation remains within air flow range (1), a test period of predetermined duration is generated by incrementing count $CIE_1$ each transition of signal IE until count $CIE_1$ is equal to maximum count $CIE_{1max}$ (step 216). During this test period (1), which is a subtest period of the test period for converter efficiency, count $CR_1$ is incremented each transition of signal REGOS (step 218). Stated another way, count $CR_1$ is increment each transition of signal REGOS until count $CIE_1$ equals $CIE_{1max}$.

When engine operation is within air flow range (2) as shown in step 204, count $CIE_2$ and count $CR_2$ are determined in steps 222, 226, and 228 in a manner similar to that described above for air flow range (1) with respect to steps 212, 216, and 218. Each transition of signal IE, count $CIE_2$ is incremented until it reaches maximum count $CIE_{2max}$ (step 222). Predetermined subtest period (2) is thereby defined. During test period (2), count $CR_2$ is incremented each transition of signal REGOS (step 228).

The above described operation occurs for each air flow range comprising the test period. When engine 28 is operating within the highest air flow range (n) for the test period, as shown in step 206, subtest period (n), count $CIE_n$, and count $CR_n$ are generated as shown in step 232, 236, and 238.

During step 250, a determination is made as to whether engine 28 has operated in all air flow ranges (1 ... n) for respective subtest periods (1 ... n) of the converter test period. Stated another way, step 250 determines when each count of transitions in signal IE ($CIE_1 ... CIE_n$) have reached their respective maximum values ($CIE_{1max} ... CIE_{nmax}$). Each count of transitions in signal IE ($CIE_1 ... CIE_n$) for respective test periods (1 ... n) are summed in step 254 to generate total count $CIE_t$. For reasons described above, the same total count $CIE_t$ may be obtained by summing each maximum count ($CIE_{1max} ... CIE_{nmax}$) for respective test periods (1 ... n).

Total count $CR_t$ is generated in step 256 by summing each count ($CR_1 ... CR_n$) for respective test periods (1 ... n).

A Ratio of total counts $CR_t$ to total count $CIE_t$ is then calculated during step 260 and all counts subsequently reset in step 262. If the calculated ratio is greater than a preselected reference ratio ($RAT_f$), a flag is set (steps 266 and 270) indicating that converter efficiency is below a preselected limit.

The actual ratio calculated from step 266 may be used to provide a measurement of converter efficiency. Due to the advantages described previously herein, this indication of converter efficiency is accurate over a wider range of converter efficiencies than heretofore possible as is apparent upon reviewing the graph of ratios versus converter efficiencies shown in FIG. 8.

An example of operation has been presented wherein both upstream sensors 44 and 55, and downstream sensor 52, are two-state exhaust gas oxygen sensors. The invention claimed herein, however, may be used to advantage with other sensors such as proportional sensors. Other modifications will become apparent to those skilled in the art without departing from the spirit and scope of the invention claimed herein. Accordingly, the inventors herein intend that the invention be defined only by the following claims.

We claim:

1. A method for controlling air/fuel ratio of an engine having exhaust manifolds from first and second cylinder banks coupled to a single catalytic converter, comprising the steps of:

adjusting fuel delivered to the cylinders of the first cylinder bank in response to a first upstream exhaust gas oxygen sensor coupled to the first exhaust manifold and a downstream exhaust gas oxygen sensor positioned downstream of the catalytic converter;

adjusting fuel delivered to the cylinders of the second cylinder bank in response to a second upstream exhaust gas oxygen sensor coupled to the second exhaust manifold and said downstream exhaust gas oxygen sensor;

creating an inferred signal by combining output signals from said first and second sensors which is an inference of an output from a hypothetical exhaust gas oxygen sensor exposed to a hypothetical blended mixture of exhaust gases from the first and second exhaust manifolds; and indicating converter efficiency in response to a ratio of a count in transitions between output states of said downstream sensor to a count in transitions between output states of said inferred signal.

2. The method recited in claim 1 wherein said inferred signal creating step includes the steps of sampling said first and second upstream sensors and reading said inferred signal from a stored memory each sample period.

3. The method recited in claim 1 wherein said inferred signal creating step and said converter efficiency indicating step occur during a test period.

4. The method recited in claim 3 wherein said test period is completed when the engine has completed operation within each of a plurality of inducted airflow ranges for at least a minimum duration in each of said airflow ranges.

5. The method recited in claim 4 wherein said minimum duration is determined when said inferred signal has completed a predetermined number of transitions.

6. The method recited in claim 1 further comprising the step of indicating degraded converter efficiency when said ratio exceeds a predetermined ratio.

7. The method recited in claim 1 wherein said step of delivering fuel to the first cylinder bank includes the steps of integrating said first upstream sensor output and trimming said integrated output with a trim signal derived from said downstream sensor output to generate a first feedback variable and adjusting fuel to delivered to the first cylinder bank in response to said feedback variable to maintain average air/fuel ratio of the first cylinder bank near stoichiometry.

8. The method recited in claim 1 wherein said step of delivering fuel to the second cylinder bank includes the steps of integrating said second upstream sensor output and trimming said integrated output with a trim signal derived from said downstream sensor output to generate a second feedback variable and adjusting fuel to delivered to the second cylinder bank in response to said feedback variable to maintain average air/fuel ratio of the second cylinder bank near stoichiometry.

9. The method recited in claim 1 wherein said transitions in said downstream sensor output are generated by comparing said downstream sensor output to a reference.

10. The method recited in claim 1 wherein said transitions in said inferred signal are generated by comparing said inferred signal to a predetermined value.

11. An air/fuel control system for an engine having exhaust manifolds from first and second cylinder banks coupled to a single catalytic converter, comprising:
   a first feedback controller for adjusting fuel delivered to the cylinders of the first cylinder bank in response to a first upstream exhaust gas oxygen sensor coupled to the first exhaust manifold and a downstream exhaust gas oxygen sensor positioned downstream of the catalytic converter;
   a second feedback controller for adjusting fuel delivered to the cylinders of the second cylinder bank in response to a second upstream exhaust gas oxygen sensor coupled to the second exhaust manifold and said downstream exhaust gas oxygen sensor;
   inference means for creating an inferred signal by combining output signal from said first and second sensors which is an inference of an output from a hypothetical exhaust gas oxygen sensor exposed to a hypothetical blended mixture of exhaust gases from said first and second exhaust manifolds, said inference means also providing a count in transitions between output states of said inferred signal; and
   indicating means for indicating converter efficiency in response to a ratio of a count in transitions between output states of said downstream sensor to a count in transitions between output states of said inferred signal.

12. The system recited in claim 11 wherein said inference means creates said inferred signal by sampling said first and second upstream sensors and reading said inferred signal from a stored memory each sample period.

13. The system recited in claim 11 wherein said indicating means indicates degraded converter efficiency when said ratio exceeds a predetermined ratio.

14. An air/fuel control system for an engine having exhaust manifolds from first and second cylinder banks coupled to a single catalytic converter, comprising:
   a first feedback controller for delivering fuel to the first cylinder bank in response to a first upstream exhaust gas oxygen sensor coupled to the first exhaust manifold and a downstream exhaust gas oxygen sensor positioned downstream of the catalytic converter;
   a second feedback controller for delivering fuel to the second cylinder bank in response to a second upstream exhaust gas oxygen sensor coupled to the second exhaust manifold and said downstream exhaust gas oxygen sensor;
   inference means for creating an inferred signal during a test period from said first and second sensors which is an inference of an output from a hypothetical exhaust gas oxygen sensor exposed to a hypothetical blended mixture of exhaust gases from said first and second exhaust manifolds, said inference means sampling said first and second upstream sensors and reading said inferred signal from a stored memory each sample period;
   test means for generating said test period when the engine has completed operation within each of a plurality of inducted airflow ranges for at least a minimum duration in each of said airflow ranges; and
   indicating means for indicating converter efficiency in response to a ratio of a count in transitions between output states of said downstream sensor to a count in transitions between output states of said inferred signal.

15. The method recited in claim 14 wherein said minimum duration is determined when said inferred signal has completed a predetermined number of transitions.

16. The system recited in claim 14 wherein said indicating means indicates degraded converter efficiency when said ratio exceeds a predetermined ratio.

* * * * *